(12) United States Patent
Wang et al.

(10) Patent No.: US 9,803,792 B2
(45) Date of Patent: Oct. 31, 2017

(54) SYSTEM AND METHOD OF SEALING PROCESS LEAKS

(71) Applicants: Jinrong Wang, Tianjin (CN); Zhi Fang Zhao, Tianjin (CN)

(72) Inventors: Jinrong Wang, Tianjin (CN); Zhi Fang Zhao, Tianjin (CN)

( * ) Notice: Subject to any disclaimer, the term of this patent is extended or adjusted under 35 U.S.C. 154(b) by 0 days.

(21) Appl. No.: 15/152,063

(22) Filed: May 11, 2016

(65) Prior Publication Data

US 2016/0281903 A1   Sep. 29, 2016

Related U.S. Application Data

(63) Continuation of application No. 12/967,574, filed on Dec. 14, 2010, now abandoned.

(60) Provisional application No. 61/394,165, filed on Oct. 18, 2010.

(51) Int. Cl.
*F16L 55/17*   (2006.01)
*F16L 55/175*   (2006.01)

(52) U.S. Cl.
CPC ............. *F16L 55/17* (2013.01); *F16L 55/175* (2013.01)

(58) Field of Classification Search
CPC ................................. F16L 55/175; F16L 55/17
See application file for complete search history.

(56) References Cited

U.S. PATENT DOCUMENTS

| | | | | |
|---|---|---|---|---|
| 4,133,351 A * | 1/1979 | Harrison | ............... | F16L 55/175 138/97 |
| 4,171,142 A * | 10/1979 | Harrison | ............... | F16L 55/175 138/99 |
| 5,118,139 A * | 6/1992 | Lott | ....................... | F16L 55/175 138/99 |
| 7,235,601 B2 * | 6/2007 | Guerin | ................. | C08K 3/0033 524/565 |
| 2007/0037911 A1 * | 2/2007 | Sugi | ....................... | C08F 279/02 524/435 |
| 2010/0330319 A1 * | 12/2010 | Tsukada | .................... | B32B 1/08 428/36.91 |
| 2011/0201750 A1 * | 8/2011 | Harrington | .......... | C08K 5/0016 524/565 |

FOREIGN PATENT DOCUMENTS

CN    101544789 B  *  9/2010

OTHER PUBLICATIONS

CN 101544789—Chinese Patent Application Publication—English machine translation.*

* cited by examiner

*Primary Examiner* — Craig Schneider
*Assistant Examiner* — David Deal
(74) *Attorney, Agent, or Firm* — Douglas Baldwin

(57) ABSTRACT

A system and method of sealing leaks in process piping and equipment without process shutdown by providing a clamp having a cavity surrounding a leaking structure, sealant equipment comprising an injection gun to inject a sealant into the clamp cavity, means for pressuring moldable sealant from the gun into the clamp cavity in a staged manner beginning at a point away from the leak site. The preferred sealant comprises a moldable nitrile rubber delayed curing (vulcanizing) formulation or composition molded into shapes for insertion into an injection gun.

7 Claims, 5 Drawing Sheets

SYSTEM AND METHOD OF SEALING PROCESS LEAKS

CROSS REFERENCE TO RELATED APPLICATIONS

This application is a continuation application of application Ser. No. 12/967,574 filed Dec, 14, 2010, claims benefit of Provisional Application Ser. No. 61/394,165 filed Oct. 18, 2010, the contents and disclosure of which is incorporated herein by reference for all purposes.

BACKGROUND

1. Field of the Invention

This invention relates to a system and method of sealing leaks in process piping and equipment without shutdown by providing a clamp having a cavity surrounding a leaking structure, sealant equipment comprising an injection gun to inject a sealant into the clamp cavity, means for pressuring moldable sealant from the gun into the clamp cavity in a staged manner beginning at a point away from the leak site. The preferred sealant comprises a moldable nitrile rubber delayed curing (vulcanizing) formulation or composition molded into shapes for insertion into an injection gun.

2. Discussion of prior art

There exist needs for effective and efficient methods for repairing leaks in industrial piping and equipment without having to stop the process flow or operation. Especially needed are methods that will perform well with all kinds of industrial media and under adverse conditions. Industrial leaks frequently result in emergencies due to the toxic or explosive nature of the leaks, damage to surrounding equipment and danger to operating personnel. To address these needs on-line leak sealing technology is widely used in companies with continual producing process, where unexpected leaks may cause an emergent shutdown and loss time and expense. With on-line leak sealing technology, leaks, which are normally found at flanges, tees, elbows, valves, pipelines, and other welded joints need to be stopped quickly and efficiently without affecting the process. But it is often extremely difficult to seal off a pipe leak in the field and particularly difficult to do so without modification of the piping and/or equipment or discontinuing the flow of leaking medium. Thus the economic benefits of an on-line leak sealing technology that is effective in industrial operations are many and significant. By solving the leaking problem while keeping an industrial plant on-line, processing plant are saved from costly unscheduled shutdown, environmental damage, unsafe and hazardous condition resulting from the leaks. Instead of replacing leaking equipment with a new one, an expensive and time-consuming solution, on-line leak sealing technology allows repair of equipment while maintaining system integrity, extending the life of the equipment components. It also protects the environment from noise and harmful emissions and avoids explosion caused by leaking combustible media.

Many commercial pipe leak sealing systems utilize fiberglass wraps with two part epoxy systems and frequently cannot be used without shutting off process media flow to suspend the leak while repairs are made. Some commercial leak repair systems require the application (injection) of two part sealants and often with mixtures of catalysts, fillers and the like. Other repair systems use special enclosures for the leaking pipe section (or equipment section) into which is injected epoxy or two part elastomeric sealants. These two part sealant systems are not totally satisfactory. Moreover, many leaking system are in pipe or equipment at high pressure and temperature and contain chemicals and/or other medium that destroy or weaken conventional sealants. It would be very beneficial to have an easily implemented method of on-line process leak repair that is easily deployed, efficient and effective utilizing easily stored leak sealant formulation which, when applied, would become vulcanized, hardened and stabilized during application. The present invention provides such a method.

SUMMARY

The present invention meets the needs discussed above by providing a system and method for sealing online leaks in process piping and equipment structures. This invention provides a sealing system having clamps placed around the leaking piping or structure, a sealant injection gun for extruding sealant into the cavities between the clamps and piping, means for pressuring a sealant from the injection gun into clamp cavity and sealant compositions. The method is widely adapted to various process industries and the wide range of pressure and temperature conditions.

More specifically the invention is a system for sealing leaks in process piping and equipment comprising, a clamp that surrounds the leak site and provides a cavity that surrounds the pipe or equipment to be sealed and has at least two ports into which sealant can be injected, an injection gun having at one end an injection port capable of mating with the clamp ports, a chamber communicating with said injection port for receiving a shaped sealant compound, a piston chamber, a piston capable of pushing the sealant through the injection port and a means for actuating the piston, a conduit between the injection gun piston chamber and a hydraulic or pneumatic pump for applying force to push the piston toward the sealant chamber and a shaped sealant composition, preferably a delayed curing nitrile rubber based sealant.

Other embodiments provide a method of sealing leaks in process pipes and structures comprising; placing a suitable clamp having dimensions that leave a cavity between the inside of the clamp and the pipe or structure, said clamp having at least two ports positioned around the surface of the clamp, connecting an injection gun through an injection port to a port of the clamp, placing delayed curing sealing compound into the injection gun, actuating a piston in the injection gun to force the sealant through the injection port and clamp port into the cavity of the clamp.

DETAILED DESCRIPTION

The system and method of this invention is effective for use in online sealing leaking flanges, equipment, holes in the pipe structure, welding defects, screw thread tie-ins and filling case leaks and for elimination of leaks of process streams of water, steam, air, oxygen, nitrogen, gas, ammonia, liquefied gas, gasoline, diesel oil, kerosene, heavy oil, lubricants, chemicals like benzene, aldehydes, alcohols, ketones, esters and derivatives, acids, alkali, esters, benzene and various heat carriers.

With the preferred nitrile delayed curing sealant composition the system and method can seal process piping and structures over a temperature range of leaking media of from −195° C.−−800° C. and at pressures of from vacuum to 32 Mpa (320 kg/cm2) or higher.

The system and method are especially useful in process piping and equipment structure in, for example, the petroleum, chemicals, power, metallurgy, medical, chemical fiber, gas, water supply and heat supply industries.

This invention provides a system for sealing leaks in process piping and equipment comprising, a clamp that surrounds the leak site and provides a cavity that surrounds the pipe or equipment to be sealed and has at least two ports into which sealant can be injected, an injection gun having at one end an injection port capable of mating with the clamp ports, a chamber communicating with said injection port for receiving a shaped sealant compound, a piston chamber, a piston capable of pushing the sealant through the injection port and a means for actuating the piston, such a hydraulic or pneumatic pump for applying force to push the piston toward the sealant chamber, and a shaped sealant composition. It is also a method of sealing an online leak in process piping or structures.

Figure 1:
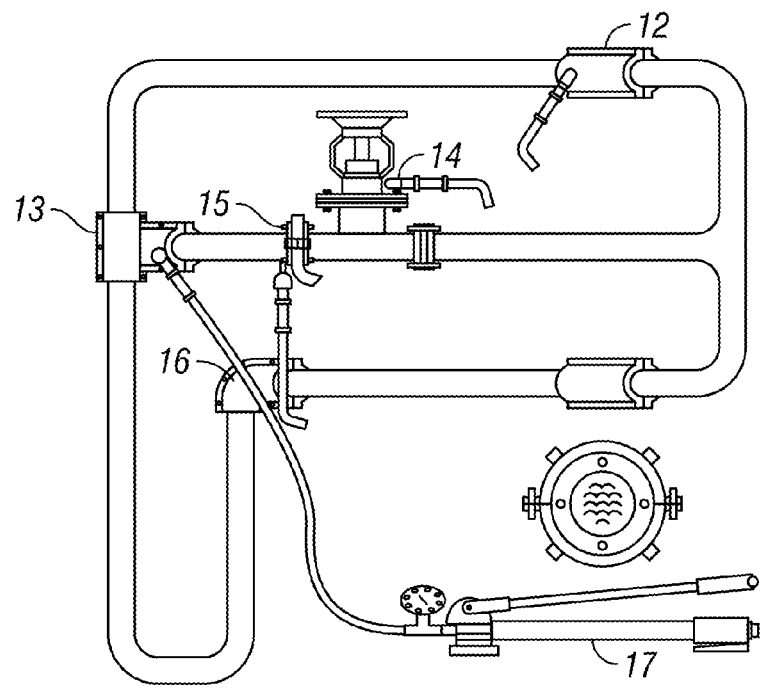
FIG. 1 is a schematic representation of various piping arrangements and clamps of embodiments of the invention.
Figure 2:
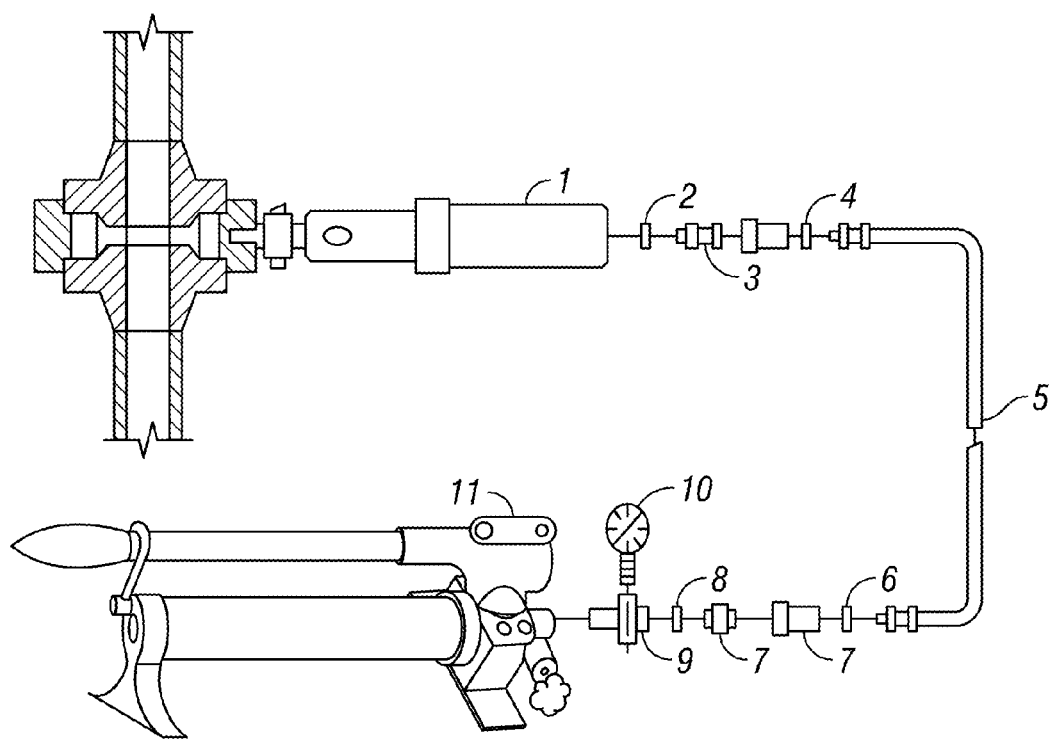
FIG. 2 is a schematic representation of one embodiment of the system of the invention.

FIG. 1 and 2 illustrates the system of the invention. Referring to FIG. 2 the system comprises a clamp (shown as "Clamp", and also shown as 12, 13 14, 15 and 16 in FIG. 1) an injection gun 1, a hydraulic (or pneumatic) pump 11 for pushing a piston in the injection gun to push sealant into an injection port of the clamp. One means of providing the force to extrude sealant into ports of a clamp is a hydraulic pump. There is shown a conduit 5 connecting the pump to the piston of the injection gun. Parts 2,3,4,6,7,8,9 and 10 are appropriate fitting for connecting the conduit 5 from pump 11 to injection gun 1. A pressure gauge 10 is useful in monitoring the pressure as the sealant is extruded into the clamp port. If the pressure becomes too high it may indicate an obstruction or blockage that must be corrected before continuing the sealant operation. FIG. 1 shows the different types of process pipe fitting and structures that may be repaired by the system and method of the invention.

Figure 3:
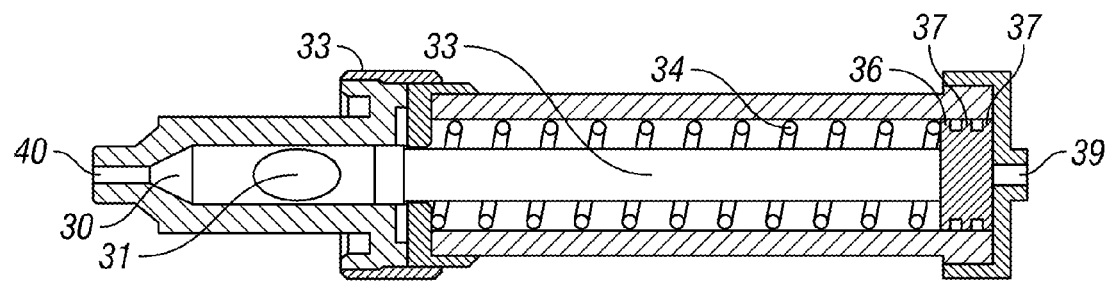
FIG. 3 is a side cross sectional view of one embodiment of an injection gun of the invention.
Figure 4:
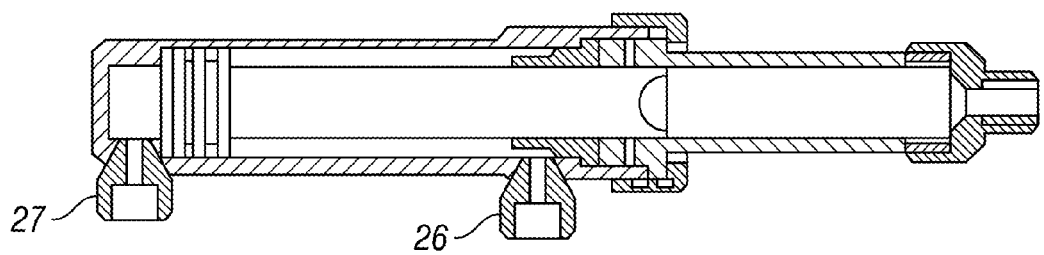
FIG. 4 is a side cross sectional view of one embodiment of an injection gun of the invention.

FIG. 3 and 4 illustrate two versions of injection guns. Referring to FIG. 3 there is illustrated a spring loaded injection gun in which the piston 37 is moved forward by hydraulic pressure from fluid into port 39, and, when the pressure is released the spring moves the piston back into its original position. In FIG. 4 is illustrated a hydraulic injection gun in which hydraulic pressure is used to move the piston forward (port 27) and back (port 26) into its original resting position. Referring to FIG. 3, there is an injection port 40 through which sealant compound is extruded through a matching port of a clamp into the clamp/pipe cavity. The injection port is of smaller diameter than the sealant chamber. Preferable the end of the injection gun at the injection port is threaded with male threads and the clamp port will have matching female threads. There is an opening into the gun sealant chamber, 31, into which is placed a shaped sealant compound (preferable a cylinder) that is to be injected into the clamp cavity. In FIG. 3, 33 is the piston, 34 a spring, 36 a stopper, 37 an "O" ring to seal the piston chamber and a hydraulic fluid inlet 39. In operation, the gun injection port 40 is attached to a port on a clamp, a cylinder of sealant compound is placed into the gun chamber 31, hydraulic fluid (or air) is pumped through conduit 5 (FIG. 2) to force the piston 33 forward, extruding the sealant through port 40 into a clamp cavity (as explained below). This operation is shown in FIG. 1 where the hydraulic pump 17 is used to force sealant into clamps 12, 13, 14 or 15. This operation is discussed more fully below under Method of Sealing.

Clamps

Figure 5:
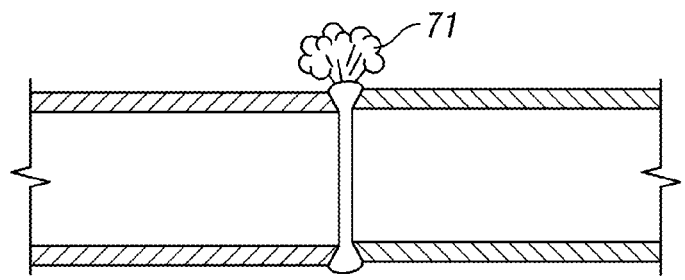
FIG. 5 is a cross sectional view of a pipe showing a leak at a weld point.
Figure 6:
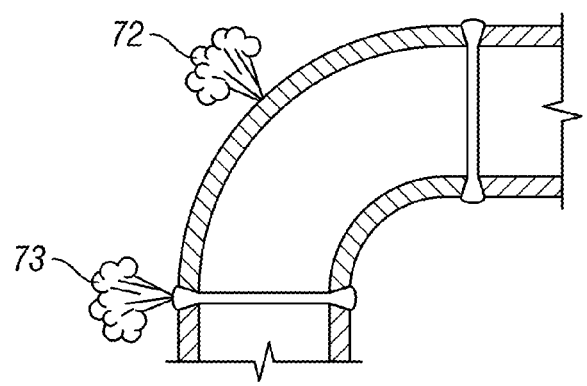
FIG. 6 is a cross sectional view of a pipe elbow showing a leak at a weld point.
Figure 7:
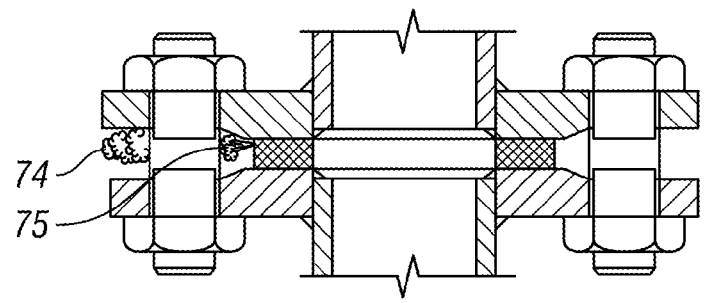
FIG. 7 is a cross sectional view of a pipe flange showing a leak at the flange joint.
Figure 8:
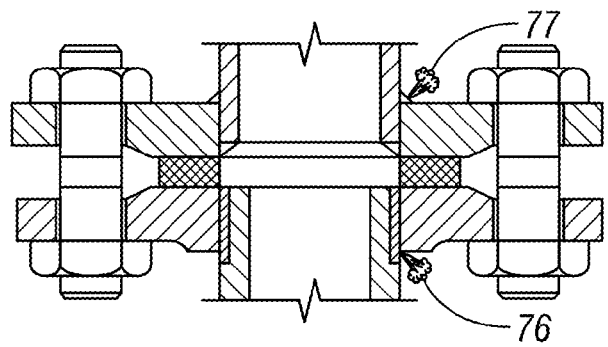
FIG. 8 is a cross sectional view of a pipe flange showing a leak at a weld point.

Suitable clamps are made of metal, preferably steel, and are constructed with sufficient strength to withstand the pressure of the extruded rubber compound and the pressure inside the clamp resulting from leaking medium. FIGS. 5, 6, 7, and 8 illustrate leaks in various pipe configurations. FIG. 5 shows a leak 71 at a welded joint of a straight pipe. FIG. 6 shows leaks 72 and 73 at welded joints of an elbow. FIG. 7 shows a leak 74 between flange faces and FIG. 8 shows leaks 76 and 77 at welds in a flange. The leaks in FIGS. 5, 6 and 8 will have similar clamps while the leak in FIG. 7 will require a clamp comprising a metal band tightened around the open face of the flange tongues.

Figure 9:
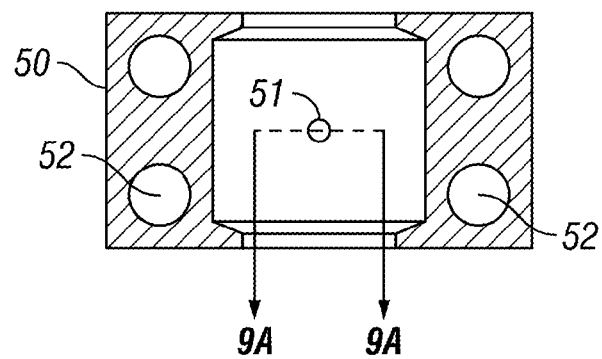
FIG. 9 is a top and side view of a pipe clamp of the invention.
Figure 9A:
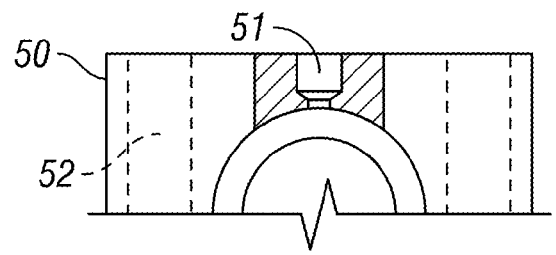
FIG. 9A is a section view of the pipe clamp of FIG. 9.
Figure 10:
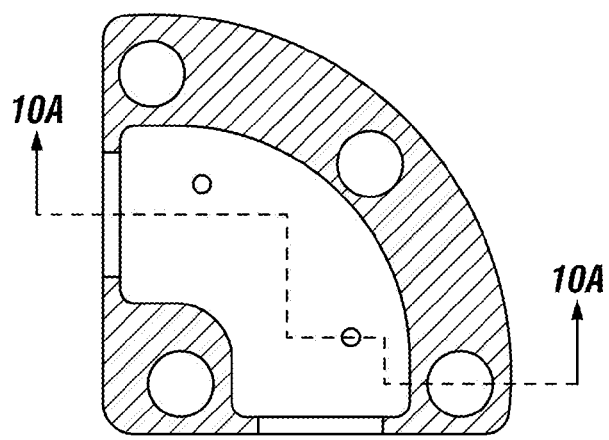
FIG. 10 is a top and side view of a pipe elbow clamp of the invention.
Figure 10A:
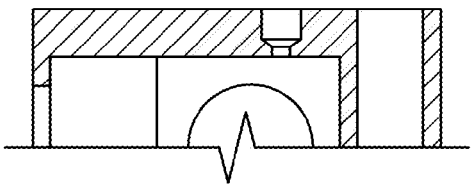
FIG. 10A is a section view of the pipe elbow of FIG. 10.
Figure 11:
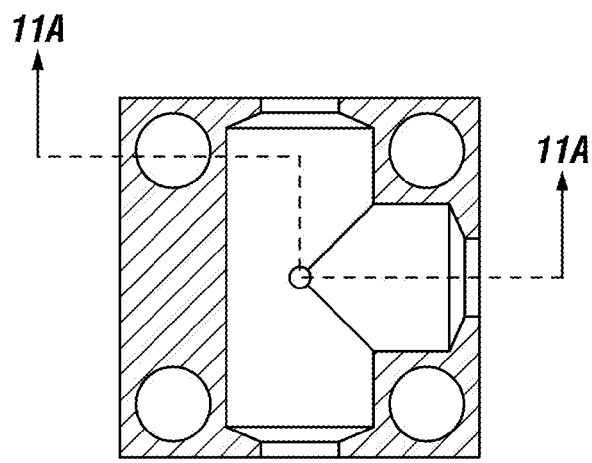
FIG. 11 is a top and side view of a pipe tee clamp of the invention.
Figure 11A:
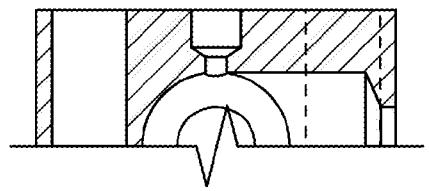
FIG. 11A is a section view of the pipe tee clamp of FIG. 11.
Figure 12:
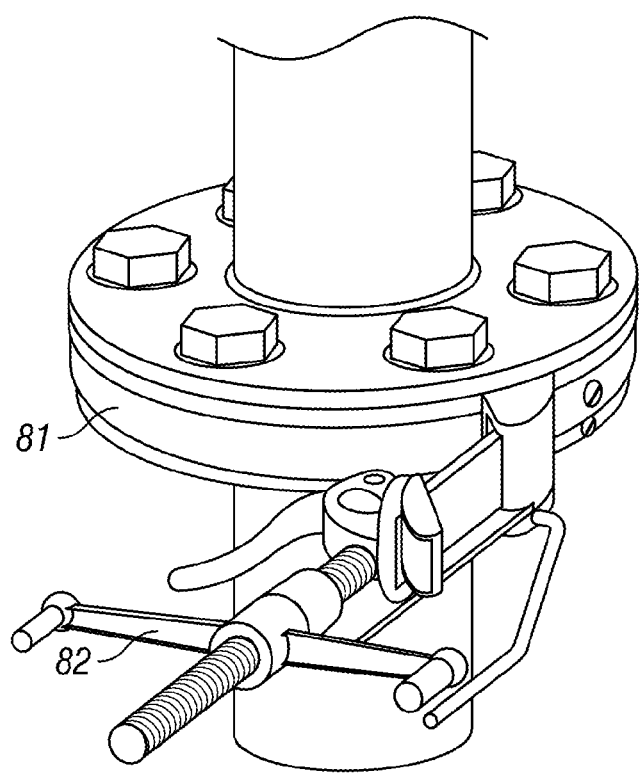
FIG. 12 is a perspective view of a flange band clamp of the invention.

The clamps will generally be removable or detachable and are constructed to provide a tight seal around the pipe at the longitudinal ends of the clamp, leaving an annular chamber or cavity in the midsection of the clamp. For example, a steel clamp for providing a seal around a leaking pipe will be constructed as two hemispheres with flanged sides that mate and can be fastened around the pipe by bolting or clamping. FIGS. 9, 10, 11 and 12 illustrate various clamp configurations for different structures. FIG. 9 shows one half of a clamp hemisphere, 50, for use on a straight pipe. It has ears like that of a flange that allow the two hemispheres to be bolted together by bolts through bolt holes 52. A single injection port 51 is shown but the clamps of the invention will have at least two port spaced around the circumference of the clamp. The difference in the circumference defined by dimensions a and c in FIG. 9 will be the width of the cavity into which sealant will be injected. FIG. 10 is a clamp for a pipe elbow, FIG. 11 a clamp for a pipe tee and FIG. 12 a special type clamp for a flange that is leaking between the flange halves as shown in FIG. 7. The clamp shown in FIG. 12 is a steel band 81 that is fitted around the open space between the flange ears and tightened into place by the device 82. In this clamp configuration the clamp port are bolt holes in the flange ears. Bolts are selectively removed—no more than half the bolts- and the holes in one ear is plugged and the other hole used as a clamp port.

The preferred clamps will have a longitudinal center section slighter larger than the outside diameter of the pipe to form an annular space or cavity such as can be seen in FIG. 9. The longitudinal ends will be approximately the diameter of the pipe (and may have graphite or metal bushing—see 105 in FIG. 13) to seal the annular space to prevent sealant from escaping during the sealing operation. All clamps have at least two ports and in some embodiments, depending on the size of the clamp, there may be as many as eight to ten ports disposed around the circumference of the clamp. The ports are smaller in diameter than the shaped sealant composition to be injected in it. In general, the ports will be large enough to allow extrusion of the dry malleable delayed curing composition but not so large as to allow a partially liquefied composition to easily flow back out of the mold. For example, in one embodiment, the composition will be shaped into extruded cylinders of about 20 mm diameter and about 90 mm long. The clamp ports will be about 5-15 mm diameter and preferably 8-10 mm. Other diameters and lengths may also be used as determined by convenience, clamp and injection means size and the like. Generally, it is preferred that the clamp ports be threads with female threads to mate with male threads of an injection gun, although other means of connecting the injection gun injection port to the clamp port may be used. The clamps are made or adapted for use on various areas of piping and equipment, including leaking pipes, elbows, tees, flanges, valves and other equipment areas where leaks occur as illustrate in FIG. 1. In the case of other shapes, as will be appreciated, the annular space and clamp seal ends will be similar to that described above for a pipe clamp but adapted to the shape of the area on to which it is to be fitted. Before extrusion and curing the sealant is somewhat plastic and malleable but not sticky. It will become generally become semi-liquid as it flows into a heated mold.

Figure 13:
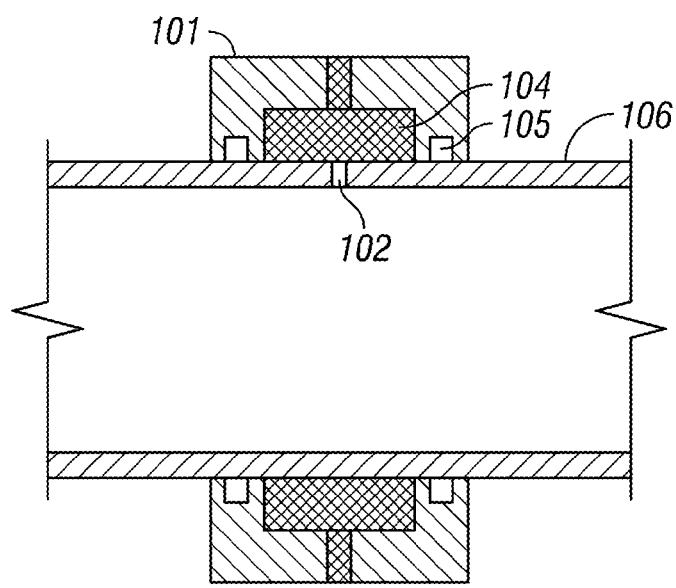
FIG. 13 is a cross sectional side view of a pipe with clamp and seal of an embodiment of the invention.

The clamps are placed around the pipe, fitting, flange or equipment to provide a cavity into which sealant is forced to provide a seal around the pipe, fitting etc. as illustrated in FIG. 13 in which clamp 101 fits around pipe 106. Sealant 104 completely fills the cavity around the circumference of the pipe when the sealing operation is complete. As indicated in FIG. 13 the diameter, D, of the finished seal is desirably D=2× sealing cavity height to provide sufficient strength and stability to the finished seal. In general, the size of the clamp will be such that it will be at least 30 mm (15 mm on each side of the leak) in longitudinal length measured along the length of the pipe.

Clamps may be made of any suitable material but for the preferred severe conditions that normally exist in industrial plants the clamps are made of steel that can be welded. Since the value of the carbon content in carbon steel and the alloying element in the alloy steel has a great influence in the performance of the welded joint the carbon content in the metallic material should be less than 0.25% to ensure weldability of the material. Suitable steels include, but are m not limited, to AISI 1020, AISI 302,304, 316.

Preferred Sealant Compositions

The preferred sealant composition of one embodiment of the invention is a delayed curing nitrile rubber based formulation that will, upon curing (vulcanization) inside a clamp cavity (such as an annular space between a pipe and clamp) provide a cured or vulcanized nitrile rubber molded seal. The composition comprises critical components formulated into a dry un-reacted malleable form that will cure or vulcanize when the dry un-reacted components are subjected to an effective amount of heat at an elevated temperature.

Vulcanization or curing is the irreversible reaction of the nitrile copolymer with sulfur or other crosslink compounds to provide cross links between the polymer strands and results in a more rigid hardened permanently formed product. A broad range of sulfur compounds may be used for vulcanization including hydrogen sulfide, sulfur oxides and the like as will be recognized by those skilled in the art. However, elemental sulfur is easily available and inexpensive but is somewhat slower to react than some other sulfur supplying compounds. Elemental sulfur is an essential component of the composition of this invention. In a preferred embodiment the delayed curing formulation will contain about 0.3 to 0.5% sulfur.

Thus, the sealant composition employs a low sulfur vulcanizing system with high efficiency that adjusts to constantly changing conditions throughout the entire injection (extrusion) process into a clamp cavity. This will optimize temperature adaptability.

Additionally, the delayed curing sealant is a delayed curing sealant that is stable at ambient conditions, easily stored and packaged, have excellent liquidity as well as formability (malleability) to meet the stringent technical requirement for use as a sealant. This composition will establish an efficient seal structure during initial injection, ductility dip, and transformation (vulcanization) to elastomer.

By judicious selection of the components the composition maximizes the functions of the vulcanized seal system to enable a wide temperature adaptability of −195 to 900° C. The composition has the advantages of wide medium resistance, injection manufacturability, excellent filling quality and sealing ability. The critical selection of base materials and accessory ingredients, this invention enhances the delayed curing compositions cross linking density in the vulcanization process, improves its physical and mechanical properties and strengthens its temperature adaptability. The formulation will be partially elastic and sufficiently plastic to be easily formed or molded. A convenient form for use in the injection guns of the system of this invention is an extruded cylinder sized to fit into the extrusion guns.

At the initial stage of injection into a heated clamp cavity, the delayed curing formulations have a high degree of liquidity and formability that make it easy for the sealant to fill the entire cavity, avoiding the existence of dead angles and ensuring a long-term sealing stability.

The delayed curing composition is a nitrile rubber composition, therefore as the term is used herein nitrile rubber is a copolymer of acrylonitrile and butadiene and is usually produced by polymerized in an aqueous emulsion. The nitrile copolymer has single unit molecules linked into large multiple unit molecules. Higher acrylonitrile content gives the copolymer more strength and greater resistance to oil degradation and swelling. Generally, the nitrile rubber useful in this invention will contain (or be made from) about 20 to 70% acrylonitrile and more preferably about 30 to 50% acrylonitrile.

A key feature of the delayed curing sealant of this invention is the proper preconditioning of the raw nitrile rubber prior to formulation with the other components. Preconditioned rubber means raw nitrile rubber that has been milled in an open mill having opposing rollers and exposed to ambient air for a period of about 16 to 24 hours. This treatment may also be termed plastication.

This preconditioning reduces molecular cohesion, decrease elasticity and increase plasticity. The high molecular weight of rubber is reduced during milling so that even light plastication can reduce the molecular weight to one-tenth its initial level.

It is preferred that the milling rollers be spaced apart about 0.5 to 0 1.5 mm to obtain the best effect. The rubber is milled and mixed in a "Two Roll Mill" that has two opposing rollers (12 inch diameter). The milling processing time for this precondition step takes about 20 minutes on average. Therefore "Preconditioning" as the term is used herein and in the claims in reference to nitrile rubber means the plastication treatment described above.

Vulcanization (or curing) accelerators are needed for adequate curing since sulfur alone does not cross link very rapidly. Generally a package of accelerators and activators are needed to modify the kinetics of crosslinking and achieve commercially suitable curing. Additives also aid in stabilization of the cured product. Very suitable accelerants for the composition of the present invention include n-cyclohexy-2-benzothizole-sultenamide, 2-mercaptobenzothiazole and 2-dibenzothiazole disulfide.

Fillers are used to achieve the unique properties of the composition of this invention. Suitable fillers for the present invention include iron oxide red, talcum powder, graphite, semi-reinforcing furnace black, clay and carbon fiber. Filler may also be chosen for color coding the various compositions of the sealants.

Plasticizers such as dioctyl phthalate (and other phthalate compounds know in the art) are also used to improve plasticity and make the formulation more malleable and suitable for extrusion.

Additionally, flame retardants such as diantimony trioxide and chlorcosane are also used in the formulation to prevent flaming and/or burning at high operating temperatures.

Since the cured rubber maybe degraded by heat, oxygen and ozone, antidegradants are also used. A rare earth nanophase material is optional but also preferred as a component in the composition. The nanophase material capitalizes on its characteristic of small diameter and active nature in cross-linking. Consequently, the temperature adaptability, leak medium resistance and mechanical performance of the sealant are significantly improved. Because of the small size of the nanometer material, the extruded composition will help overcome space resistance to produce good dispersion and resistance to exposure degradation. Additionally, the chemically active rare-earth element facilitates the cross-linking effect in the process of vulcanization, which strengthens the inhibitory molecules' conformational change, better stabilizes the sealing structure and improves the temperature adaptability, medium resistance and mechanical performance of the seal. As a result of the compacting effect of the injection process, the injected composition prevents penetration by the leaking medium. The linked reactive groups form stable bonds that will not chemically react with nor be eroded by the leaking medium. Thus the nanophase material extends the compositions adaptability under various working conditions.

A very suitable rare earth material is neodymium.

The preferred filaments in the formulation are flexible metallic wire including brass, copper, aluminum, lead or zinc. Steel wire may be used but is generally too stiff to be included into an extrudable sealant. Polymer filaments may also be used but generally must be selected with careful consideration of the curing and use conditions—those that melt or become too flexible at operating temperatures are not suitable. In general, nylon and similar materials may be useful if the operating temperature is relatively low. The metal filaments will generally be about 5 mm to 15 mm in length and 0.3-0.5 mm diameter. If the filament is too short it will not provide sufficient strength to the final vulcanized material to be useful and if too long will not be extrudable in applications where it is used as an extrudable pipe leak sealant or other applications where the dry un-reacted is injected or extruded into place.

Typically the nitrile compositions of the invention will harden from about 40 Shore A to about 70 to 80 Shore A when cured. For example, one formulation having low sulfur, iron oxide and talcum powder fillers will harden from about 40 Shore A to about 69 Shore A after heating at 150° C. for 30 minutes. Another formulation having higher sulfur content and graphite filler hardens from about 40 Shore A to about 80 Shore A on heating for 30 minutes at 150° C.

Tensile strength of the compositions of the invention are about 0.7 Mpa (under ambient condition) and inv crease to about 4.3 after heating at 150° C. for 30 minute.

In sum, the delayed curing compositions of this invention will comprise, by weight: 10-20% preconditioned acycronile-butadene rubber; 0.3 to 0.5% sulfur; 6 to 12% cross-linking compounds and fire retardant agents selected from the group consisting of diantimony trioxide, and chlorcosane; 1 to 6% accelerant selected from the group consisting of n-cyclohexyl-2-benzothizole-sultenamide, 2-mercaptobenzothiazole and 2-dibenzothiazole disulfide or a combination thereof; 3 to 8% zinc oxide and/or stearic acid activators; 50 to 60% total fillers selected from the group consisting of iron oxide, talcum powder, graphite, semi-reinforcing carbon black, clay and combinations thereof; 10 to 20% plasticizer; 0-2% rare earth nanophase material; 2 to 5% antidegradant; and 2 to 5% metallic filament.

Table 1 shows the curing time needed for complete vulcanization (curing) of illustrative compositions of this invention. These compositions generally reflect the time needed in the clamp cavity to provide a proper seal. Composition A (a composition of this invention) in Table 1 is a composition as described above with 0.2% sulfur and iron oxide and talcum powder as fillers. Composition B substitutes graphite for the iron oxide and talcum powder and has higher sulfur content.

TABLE 1

Temperature and delayed curing composition curing time

| Temperature ° C. | Composition A Curing Time, Min. | Composition B Curing Time, Min. |
|---|---|---|
| 150 | 110 | 150 |
| 200 | 54 | 86 |
| 250 | 31 | 40.5 |
| 300 | 17 | 24.5 |
| 350 | 11 | 15 |

During curing the composition will lose weight as organics are driven off—the amount of weight loss depending upon the temperature of curing. This weight loss is illustrated for composition A in the following Table 2.

TABLE 2

| Temperature ° C. | Weight Loss- % of Original |
|---|---|
| 250 | 4.31 |
| 350 | 13.18 |
| 450 | 21.55 |
| 500 | 26.68 |
| 600 | 29.67 |
| 700 | 32.33 |
| 791.5 | 35.04 |

Method of Sealing

The method of sealing a leaking pipe or structure is accomplished by extruding a sealing composition into a clamp cavity surrounding the leaking structure. A specially designed clamp, as described above, is placed over the pipe, pipe fitting, flange or other part to be sealed. The clamp provides an annular space or cavity around the pipe into which the sealant is injected by extruding through ports in the cavity. It is preferred that the annular space in the clamp be from about 5 m to 20 mm in width (from outside diameter of the pipe to inside surface of the clamp). It will be appreciated that for the more complex clamps the size of the annular space will vary but the 5 mm to 20 mm width should generally be applicable at the site of the leak. Clamps around flanges, where the entire gap between the flanges is sealed with will necessarily have a cavity the width of the space between the inside flange faces.

Sealant composition is extruded into the clamp cavity from the injection gun. An injection gun from which a cylinder of sealant composition is extruded into a clamp may be powered by a high pressure hydraulic or pneumatic pump, preferably a hand pump to prevent any sparks in the vicinity of an industrial leak or by any other suitable means. If the clamp is heated, as it would be if the medium in the pipe is heated, the composition, in one embodiment where a delayed curing nitrile rubber formulation is the sealant (as described below) will soften and, if the temperature is sufficiently high, will partially liquefy, as it moves into the clamp cavity. Partial liquefaction hastens curing and allows the composition to more easily fill the mold.

To complete the seal the extruded delayed rubber sealant will be heated (which may be effected by heat of the pipe) for sufficient time to cause the composition to cure (vulcanize) or otherwise set. The time will depend upon the temperature as shown in Table 1 for delayed curing nitrile rubber compositions. As can be seen, for the delayed curing composition of some embodiments of this invention the temperature will be at least 80° C. to accomplish a cure in any reasonable time. At higher temperatures the cure will be much faster. The composition will form a tight molded seal that can withstand temperatures as high as 900° C. Since curing is not initiated below 80° C. the nitrile rubber delayed curing composition remains stable at ambient conditions and can easily be stored. At lower temperatures a different sealant compound, such as a Teflon® or epoxy composition may be used.

At the initial stage of injection into the clamp, the nitrile rubber composition has a high degree of liquidity and formability that make it easy for the composition to fill the entire clamp cavity, avoiding the existence of dead angles and ensuring a long-term sealing stability. Its excellent liquidity and formability in the initial injection stage allows the sealant to fill in every corner of the mold cavity. The design of the clamps, the properties of the delayed curing sealant and staged injection (as explained below) will prevent the composition from entering the leaking media stream and therefore not contaminate the media, but will solidify as it fully fills the entire cavity space, building a structure around pipe, fitting, valve or flange.

The clamp annular space or cavity is filled by staging the injecting the sealant into ports situated around the surface of the clamp—for a straight pipe clamp the ports will be disposed around the circumference of the clamp. The progress of the injection can be monitored by observation of the pressure gage on the pump. The pressure will build until the sealant begins to extrude. The pressure will remain reasonably steady—if the pressure is maintained—as the sealant enters the clamp cavity. Some pressure fluctuation will occur as the sealant shrinks (See Table 2). If the pressure begins to rise, the injection should be terminated and the equipment inspected because the increased pressure probably indicates a blockage or other restriction. Moreover if the pressure is pumped too high the clamp, pipe of gun may be damaged. Staged injection is very important to obtain a good seal.

The sealant composition is first injected into a port opposite or well away from the point of the leak. As the first injections fills the section of the clamp adjacent the injection port additional composition is injected into ports nearer the leak. Lastly, composition is injected into a port nearest the leak—the unfilled cavity at the point being relatively small so as to not allow the leaking medium to mix with or contaminate the earlier injected composition. As explained above smaller port diameter compared to the shaped composition size helps hold the sealant in the clamp cavity until it is sufficiently cured and hardened to not flow back through the port. As the annular cavity is filled, from a point away from the leak and sequentially around to the leak point, the injected composition has the anti-tensile and tear-resistance strength to withstand the pressure of the leaking medium's ejection. This helps to avoid being dispersed and sprayed; after being compacted and solidified, the seal has sufficient load bearing ability to ensure that the operational success rate reaches almost 100%.

Metallic filaments in the preferred delayed curing composition provide a wide range of adaptability to temperature and pressure. Where the gap between a mold and the leakage is large, the filament helps prevent the composition from coming out of the mold port.

In the foregoing specification, the invention has been described with reference to specific embodiments thereof. It will, however, be evident that various modifications and changes can be made thereto without departing from the broader spirit and scope of the invention as set forth in the appended claims. The specification is, accordingly, to be regarded in an illustrative rather than a restrictive sense. Therefore, the scope of the invention should be limited only by the appended claims.

The invention claimed is:

1. A method of sealing leaks in process pipe walls comprising;

providing a solid nitrile rubber sealant composition in an injection gun connected to an enclosed cavity formed by a recess in a clamp and the pipe wall, the clamp having at least two injection ports, surrounding a process pipe surface having a leak, liquidifying the solid nitrile rubber sealant composition by application of pressure, injecting the sealant so liquidified into the enclosed cavity and curing the sealant composition at a temperature at least about 80° C. to form a solid seal around the process pipe, wherein the clamp is shaped to fit around a pipe, the clamp having a top side and underside with an underside surface, edges and tabs extending downward from edges of the underside surface that will contact a pipe wall when in use wherein the clamp that surrounds a leak site in a pipe has a cavity on the underside of the clamp that when placed against the wall of a leaking pipe defines an enclosed space that forms a mold for a delayed curing sealant and that has at least two ports into which a delayed cure sealant can be injected and wherein pressure is applied with an injection gun having at one end an injection port capable of mating with the clamp ports, and an open port in the injection gun; a piston chamber and piston, the piston sized to project past the open port and having a spring disposed in the chamber in a manner that it is compressed when the piston is moved forward by hydraulic pressure toward the injection gun and that expands to return the piston to its starting position when hydraulic pressure is released; a conduit connection means at the end of the injection gun opposite the injection port; and a conduit between the injection gun piston chamber; and a hand operated hydraulic pump for providing pressure on the piston of the piston chamber to move the piston towards the injection gun.

2. The method of claim 1 wherein the cavity is from about 5 mm to 20 mm in width from outside diameter of the pipe to the inside surface of the clamp that forms the cavity around the pipe and wherein the cured sealant has a hardness of 40-80 Shore A.

3. The method of claim 1 wherein the clamp has at least two ports for injecting fluidized sealant and wherein the liquefied sealant is injected into ports on a clamp in sequence, beginning with the port the greatest distance from the site of the leak in the pipe and adding sealant to port(s) away from the leak ending with sealant in a port nearest the leak.

4. The method of claim 1 wherein the clamp is made of steel and comprises two halves with flange ears and bolt holes for removably attaching the clamp around a leaking pipe and the seal is cured at a temperature of at least 150° C. for at least 110 minutes.

5. The method of claim 1 wherein the nitrile rubber sealant composition consists by weight: 10-20% preconditioned acrylonitrile-butadiene rubber; 0.3 to 0.5% sulfur; 6 to 12% cros slinking compounds and fire retardant agents selected from the group consisting of diantimony trioxide, and chlorcosane; 1 to 6% accelerant selected from the group consisting of n-cyclohexyl-2-benzothiazole sulfonamide, 2-mercaptobenzothiazole and 2-dibenzothiazole disulfide or a combination thereof; 3 to 8% zinc oxide and/or stearic acid activators; 50 to 60% total fillers selected from the group consisting of iron oxide, talcum powder, graphite, semi-reinforcing carbon black, clay, and combinations thereof; 10 to 20% plasticizer; 0- 2% rare earth nanophase material; 2 to 5% antidegradant; and 2 to 5% metallic filament.

6. The method of claim 1 for sealing leaks in pipe walls wherein the cavity forms a mold for sealant that cures to form a tight hard molded structure around the pipe wall at the site of the leak.

7. The method of claim 1 wherein the clamp comprises two removable hemispheres sized to fit around a pipe at the location of a leak and wherein the hemispheres have ears that can be connected together and that have a recess on the inside surface of the hemispheres that will form a cavity when the clamps are attached around a pipe wall.

* * * * *